Aug. 25, 1964     R. D. MARX     3,145,968
SUMP DRAIN VALVE
Filed Aug. 9, 1961     2 Sheets-Sheet 1

*INVENTOR.*
ROBERT D. MARX
BY
Morgan, Finnegan, Durham & Pine
ATTORNEYS

United States Patent Office 3,145,968
Patented Aug. 25, 1964

3,145,968
SUMP DRAIN VALVE
Robert D. Marx, Valley Stream, N.Y.
(952 Meeker Ave., Brooklyn, N.Y.)
Filed Aug. 9, 1961, Ser. No. 130,348
10 Claims. (Cl. 251—144)

This invention relates to drain valves and, more particularly, to an improved sump drain valve for truck tanks such as aircraft refuelers.

A typical known drain valve for use in the sump or water retention area of an aircraft refueler provides a valve casing, a portion of which is installed within the sump, as by screwing a pipe-threaded end portion of the casing into a threaded ferrule, spud or the like in the base of the sump. The casing walls within the sump generally include ports for admission of the water or other contaminant into the casing from the sump while the interior of the casing includes a valve having a head section to which is sometimes secured a resilient or composition element serving as a seal. The valve head cooperates with a passageway within the casing which communicates with the inlet ports and with an outlet while the valve stem is connected by way of a rocker arm or the like to an external control lever which is fastened in turn by way of a cable to the control cabinet of the truck. The outlet end of the valve also connects to the control cabinet by way of tubing or the like. When actuated from the control cabinet, the valve is opened permitting the contaminant to drain to a master valve in the cabinet where it may be discharged.

This known arrangement has a number of significant disadvantages. To replace the seal of the valve head when leaks develop, it is necessary to remove and disassemble the entire valve. When reinstalling the valve or replacing one, misalignment between the outlet end of the valve and the tubing which connects the same to the control cabinet frequently occurs due to the threaded-type connection of the valve to the threaded ferrule or spud. In addition, the valve is frequently located in a rather inaccessible and cramped space where the use of a large pipe wrench or other tool involves considerable difficulty. In actuating the valve by way of the control linkage, over-travel can occur with attendant damage to the valve and/or its internal actuating components.

It is therefore an object of the invention to provide an improved sump drain valve which is installed, replaced, repaired and controlled with greater ease and simplicity than presently known valves.

Another object of the invention is to provide an improved sump drain valve having a limit feature inherent in the design thereof to prevent over-travel in control movements.

A still further object of the invention is the provision of an improved sump drain valve having greater capacity for unrestricted and complete drainage and which includes its own integral sump or drain pocket.

An additional feature of the invention is an improved sump drain valve which in installation, is automatically aligned with the control line and outlet tube therefor and which includes means for facilitating connection of the valve outlet with the outlet tube.

A still further object of the invention is an improved sump drain valve the sealing element of which may be easily replaced in typical installations without valve removal or other extensive disassembly.

These and other objects and advantages of the invention will be set forth in part hereinafter and in part will be obvious herefrom, or may be learned by practice with the invention, the same being realized and attainable by means of the instrumentalities, combinations and improvements pointed out in the appended claims.

The invention consists in the novel parts, construction, arrangements, combination and improvements herein shown and described.

Serving to illustrate an exemplary embodiment of the invention are the drawings of which:

Figure 1:
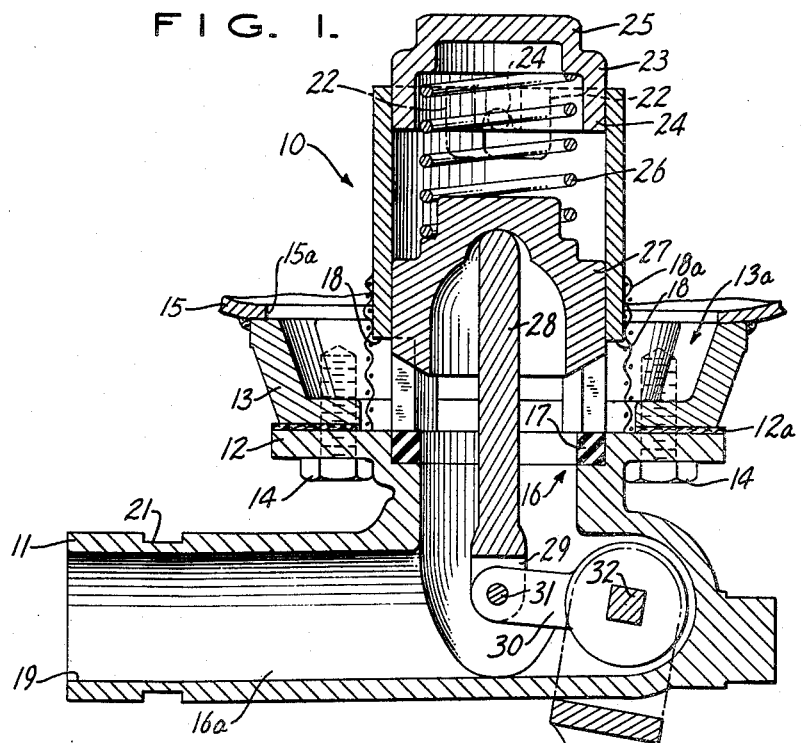
FIGURE 1 is an elevation view, in section, of the valve according to the invention.
Figure 2:
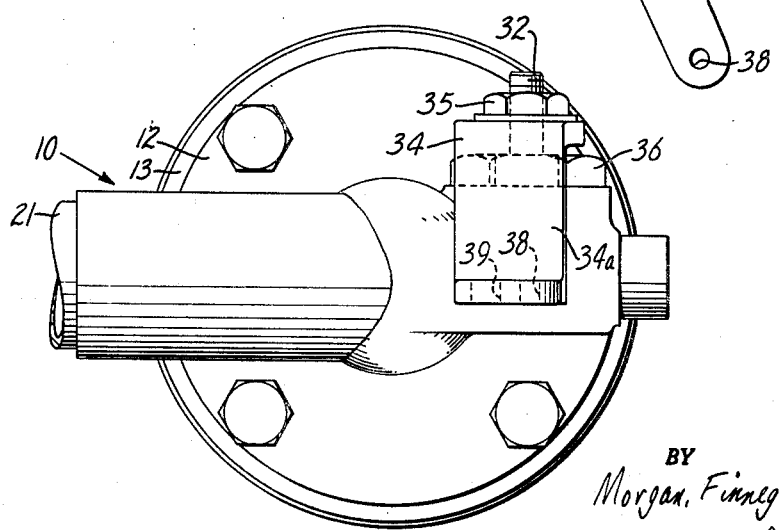
FIGURE 2 is a bottom view of the valve of FIGURE 1.

As may be seen in the figures, the valve according to the invention includes a casing 10, the lower section of which includes a flange 12 which is adapted for connection by way of connecting means to collector chamber means, illustratively an annular ring structure 13. As embodied, the connecting means comprise cap screws 14 which pass through flange 12 and are threaded into ring 13. The screws also serve to limit rotation of the valve casing relative to the ring member. The ring 13, which serves to define a sub-sump region or drain pocket 13a, depends from and is connected as by welding to the sump base region of tank 15 and surrounds the drain hole 15a provided therein. A sealing gasket 12a is interposed between the flange 12 and ring 13.

In the region of flange section 12 and concentric therewith is a seat section 16, the periphery of which includes a resilient seal 17. The casing 10, just above seal 16, includes a plurality of ports 18 circumscribed by a screen 18a. With the casing installed within ring 13, the ports 18 are located within the drain pocket 13a and the fluid to be drained passes from the sump section of the tank to ports 18 via the pocket or chamber, through port 16 and through a passageway 16a which communicates with an outlet 19 in a nozzle 11. The latter is connected to and preferably integral with casing 10.

Nozzle 11 has an annular groove 21 for facilitating the connection thereto of a drain tube, not shown, the other end of which terminates at the main drain point for the tank, generally found in the truck control cabinet.

Figure 3:
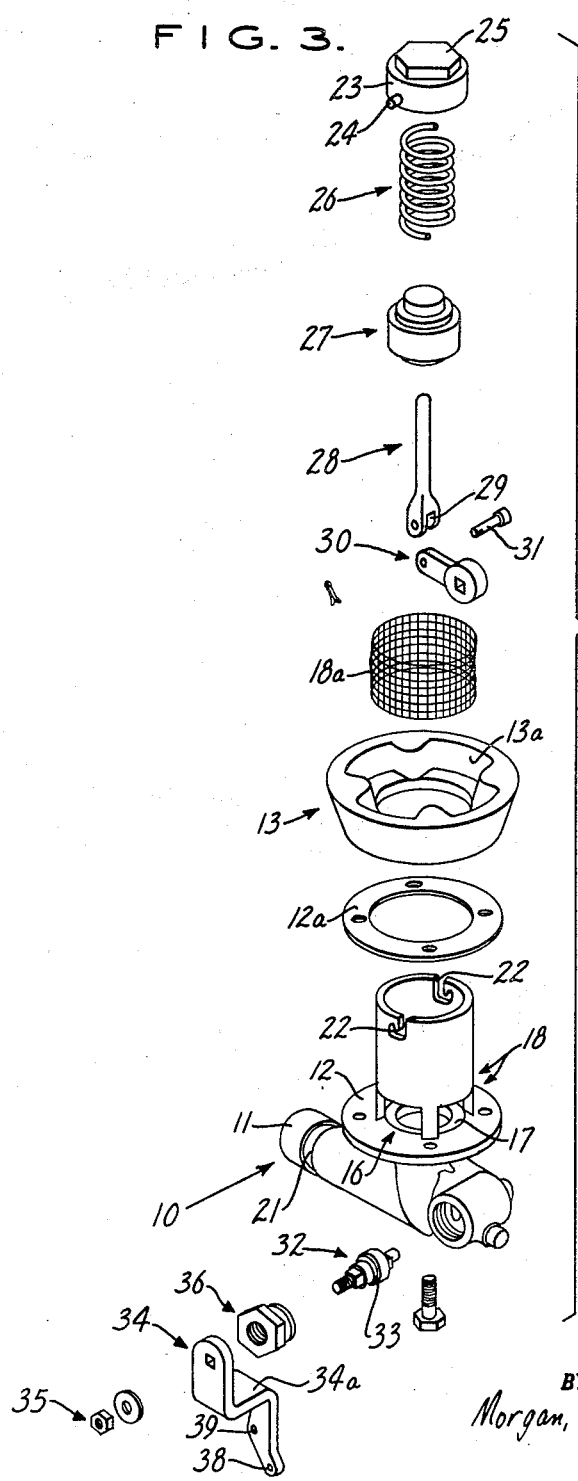
FIGURE 3 is an exploded view illustrating the component parts of the valve in disassembled and ordered relationship.

The upper end of casing 10 is provided with angulated keyways 22, illustrated clearly in FIGURE 3, which adapt the casing to receive a fractional-turn plug 23 having a bayonet-type connector base 24 and a hex head 25. A recess in the base of cap 23 receives a spring 26, the other end of which engages the shoulder portion of a valve head 27 to urge the head into closing relationship with respect to seat 16.

Control means for operating valve head 27 are provided and as embodied include a steam 28 having an integral clevis 29. Valve head 27 is pivotably fitted on the rounded end of the stem. Rotatably coupled to the other end of the stem, as by a pivot pin 31, is a control link 30 which is disposed within clevis 29. The other end of link 30 is fixedly attached to a control shaft 32. Shaft 32 includes sealing O-ring 33 and is rotatably installed in an extension of casing 10. The other end of shaft 32 fixedly engages a control lever 34, being secured thereto by nut 35. A coupling 36 retains the control assembly including shaft 32 in correct position with respect to casing 10.

Control lever 34 includes a hole 38 to adapt the lever to connection with remote control means, e.g. a control cable (not shown). A further hole 39 is also provided to facilitate the connection of a spring (not shown) to the lever in those applications where such a spring is required.

To prevent over-travel control lever 34 is configured in such a manner that it contacts casing 10 after the lever has been moved a predetermined amount which is sufficient to open the valve. Illustratively, this is accomplished by off-setting lever 34 as at 34a so that it is turned inwardly towards the valve to effect proper contact with the casing. Over-travel and attendant damage is thus prevented.

In a typical installation, the illustrated valve is operated remotedly from a control cabinet at the rear of the truck. A remote control mechanism therein provided, is actuated and by way of cabling or the like produces actuation of control lever 34. As seen in FIGURE 1 a displacement of lever 34 in the clock-wise direction causes valve head 27 to leave its seat 16 thus permitting the sump product to pass to outlet 19 and by way of external tubing or the like, to a main drain valve in the control cabinet. When this latter valve is opened the sump product is discharged from the illustrated valve and from similar valves located in other tank compartments. With the sump valve of the invention opened, large capacity drainage is provided, the contaminant in the sub-sump region 13a flowing in unrestricted manner through the ports 18, and through the port 16 to be ultimately discharged.

Upon operating the remote control mechanism to the closed position, control lever 34 is returned under the action of spring 26 to its closed position in which event valve head 27 closes port 16 thus sealing the sump section.

For effecting repairs or other maintenance the drain valve may be readily removed from its installed position by loosening the cap screws 14 and disconnecting the drain tube whereupon casing 10 may be withdrawn from the sump region. Upon being returned to its installed position, the valve is automatically aligned with the external drain tube and remote control cable.

For replacement of the spring, valve head or seal, it is possible in many installations having man-holes, to remove first the plug 25 and then the spring and valve head from a point on top of the tank with long-handled pliers or the like. A hook can be employed to remove seal 17. All of these steps are accomplished without removing the valve from the tank.

It may be seen from the above that the maintenance procedures do not require large tools nor extensive tool manipulations wihch are extremely difficult in the confined and crowded space occupied by the valve. It is also evident that any damage caused by foreign objects will be confined to the seal and valve head which elements are readily replaced.

The invention is not limited to the specific mechanisms shown. Modifications may be made thereto within the spirit of the accompanying claims.

What is claimed is:

1. A sump drain arrangement for use in draining sump products from a truck tank and the like comprising a drain valve unit having a casing with a port therein, a passageway communicating with said port and a valve adjusted to selectively close said passageway, said valve including a valve head and a stem on the end of which said head is pivotally supported and said casing being provided with a resilient seal adapted to be contacted by said head; access means on said casing adapted for release from a remote point for providing access to said valve head, said head being oriented in said casing and said casing being configured whereby release of said access means permits removal of said valve head and said seal from said casing without the need to remove said unit from said tank, collector chamber and valve receiving means adapted to be secured to and depend from the sump section of said tank and to delimit the drain hole in said sump section, said chamber means having an opening for receiving said valve unit, said casing port being in communication with said drain hole via said chamber; and lever control means coupled to said valve head for controlling drainage through said passageway.

2. A sump drain arrangement as set forth in claim 1 in which said chamber means comprise an annular ring adapted to be secured to the periphery of said drain hole below said sump section to thereby define in cooperation with said valve unit, a sub-sump region for collecting said drain product.

3. A sump drain arrangement as set forth in claim 1 including a plurality of spaced connectors for securing said valve to said chamber means and for forming a non-rotatable connection therebetween.

4. A sump drain arrangement as set forth in claim 1 in which said chamber means comprise an annular ring and said casing includes a flange adapted to be secured to the base of said ring.

5. A sump drain arrangement for use in draining a sump product from truck tanks and the like comprising a valve casing adapted to be inserted into the sump section of said tank through the drain hole provided therein, a port in said casing in communication with said sump section, an outlet in said casing, a passageway in said casing communicating with said outlet and with said port and having a resilient valve seat, a valve head and stem on which said valve head is pivotally supported in said casing for controlling said passageway, a control lever external of said casing and coupled to said valve for operating the same, said control lever being adapted for connection to remote control means for remote operation thereof and being configured to contact said casing upon predetermined movement of said lever to prevent over-travel.

6. A sump drain arrangement as set forth in claim 5 including collector chamber and valve receiving means adapted to be secured to the periphery of said drain hole and having an opening for receiving said valve casing, said casing being secured to said chamber with the port thereof within the chamber whereby the latter acts as a sub-sump.

7. A sump drain arrangement as set forth in claim 6 including a plurality of spaced connectors for securing said casing to said chamber means and for preventing rotation and ensuring automatic alignment therebetween.

8. A sump drain arrangement as set forth in claim 6 in which said collector chamber means comprise an annular ring and in which said casing includes a flange mounted to the base of said ring.

9. A sump drain arrangement as set forth in claim 6 in which said outlet comprises a nozzle section of said casing having an external annular groove for adapting said nozzle to connection with a discharge line.

10. A sump drain arrangement as set forth in claim 6 including spring means in said casing for urging said valve head into closing relation and a fractional-turn plug at one end of said casing for confining said spring within said casing and permitting ready access to the interior of said casing.

References Cited in the file of this patent

UNITED STATES PATENTS

| 1,505,965 | Moore | Aug. 26, 1924 |
| 1,568,159 | Heywood | Jan. 5, 1926 |
| 1,825,124 | Pierret | Sept. 29, 1931 |
| 2,442,953 | Krone | June 8, 1948 |
| 2,550,863 | Roehr | May 1, 1951 |
| 2,589,346 | De Frees | Mar. 18, 1952 |
| 2,628,085 | Rauen | Feb. 10, 1953 |
| 2,927,601 | Martin | Mar. 8, 1960 |

FOREIGN PATENTS

| 537,363 | Canada | Feb. 26, 1957 |